Sept. 11, 1923.

W. R. TWIFORD

WIND MOTOR

Filed June 7, 1922

WITNESSES

INVENTOR
William R. Twiford
BY
ATTORNEYS

Sept. 11, 1923.

W. R. TWIFORD
WIND MOTOR
Filed June 7, 1922

WITNESSES

INVENTOR
W. R. Twiford
BY
ATTORNEYS

Sept. 11, 1923.
W. R. TWIFORD
WIND MOTOR
Filed June 7, 1922   4 Sheets-Sheet 3
1,467,962
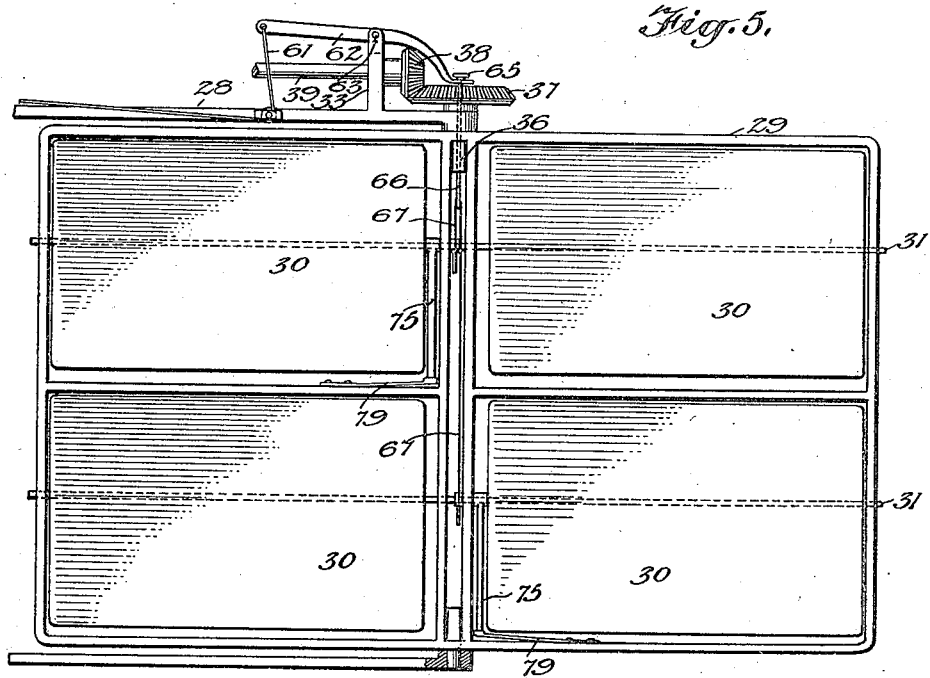
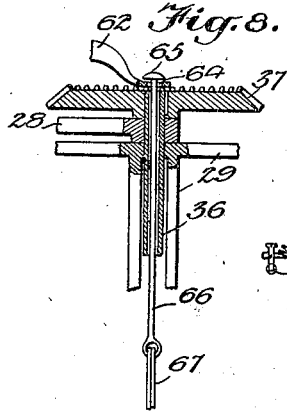
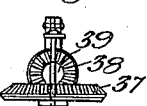
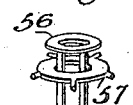
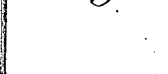
WITNESSES
INVENTOR
Wm. R. Twiford
BY
ATTORNEYS Sept. 11, 1923.
W. R. TWIFORD
1,467,962
WIND MOTOR
Filed June 7, 1922
4 Sheets-Sheet 4
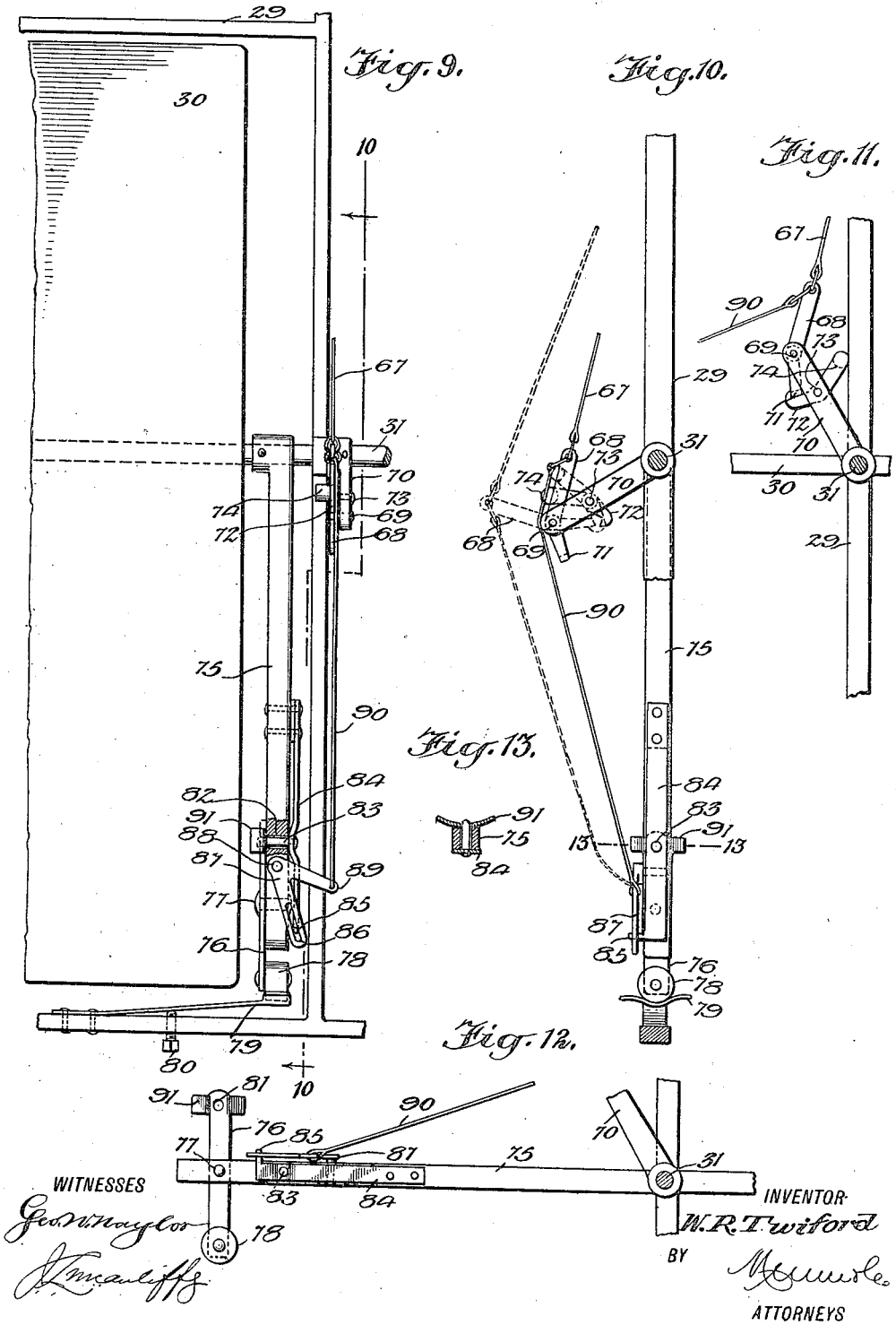
WITNESSES
INVENTOR
W. R. Twiford
BY
ATTORNEYS Patented Sept. 11, 1923.

1,467,962

UNITED STATES PATENT OFFICE.

WILLIAM RICHARD TWIFORD, OF MIAMI, FLORIDA.

WIND MOTOR.

Application filed June 7, 1922. Serial No. 566,515.

*To all whom it may concern:*

Be it known that I, WILLIAM RICHARD TWIFORD, a citizen of the United States of America, and a resident of Miami, in the county of Dade and State of Florida, have invented a new and Improved Wind Motor, of which the following is a description.

My invention relates to wind mills or wind motors and more particularly to a wind motor of the merry-go-round type, or type in which a series of blades is carried by a frame to revolve about the mast as an axis, the blades feathering to present in succession a broad surface to the wind at the wind side of the motor and to be presented more or less edgewise to the wind at the opposite side of the axis of rotation of the motor.

An important object of my invention is to provide for employing with a merry-go-round wind motor a controlling wind wheel in substitute for the usual vane for controlling the blades of the motor for keeping the motor in the wind with the shift of the wind.

A more specific object is to provide a pair of wheels in substitute for a vane and so formed and related as to present the maximum surface to the wind and having in view a practical installation of the controlling wheel with the merry-go-round motors of large size.

A further object of the invention is to provide a novel sectional arrangement of the motor blades in which each blade is made up of a series of leaves or sail sections and to provide manually operable means to variously present the surface of the leaves more or less to the wind or edgewise to the wind for throwing the motor out of operation.

An object also is to provide a merry-go-round motor wheel assemblage with control means for said wheel of such a character as to permit of guy elements being employed on the wheel and additional guy elements for the mast outside of the wheel so that a wind motor of large size may be made practical which is not possible with a merry-go-round motor employing a vane.

The means and manner of attaining the stated objects and others will clearly appear as the description proceeds.

Reference is to be had to the accompanying drawings forming a part of this specification, it being understood that the drawings are merely illustrative of one example of the invention.

Figure 5 is an elevation of one of the sectional blades of the motor;

Figure 6 is a fragmentary vertical section at the mast showing the assemblage of the central sleeve for the frame of the blades and showing features of the operating means for varying the angle of the blade sections;

Figure 7 is an edge view of a blade with the sections disposed edgewise or out of the wind;

Figure 8 is a detail in vertical section at the axis of rotation of a blade;

Figure 9 is a detail in elevation showing the means for latching and releasing the blade sections in the frame of the blade;

Figure 10 is a vertical section on the line 10—10, Figure 9;

Figure 11 is a fragment of parts shown in Figure 10 and showing the parts in different position from Figure 10;

Figure 12 is a sectional plan view of parts shown in Figures 9 to 11 and given as an aid to elucidate the latching and releasing means for the blade sections;

Figure 13 is a detail in horizontal section as indicated by the line 13—13 of Figure 10;

Figure 14 is a detail in vertical section at the top of the mast showing the connection of braces to be hereinafter referred to;

Figure 15 is a detail in perspective the features pertaining to an operating means for the latching devices of the blade sections.

Figure 1:
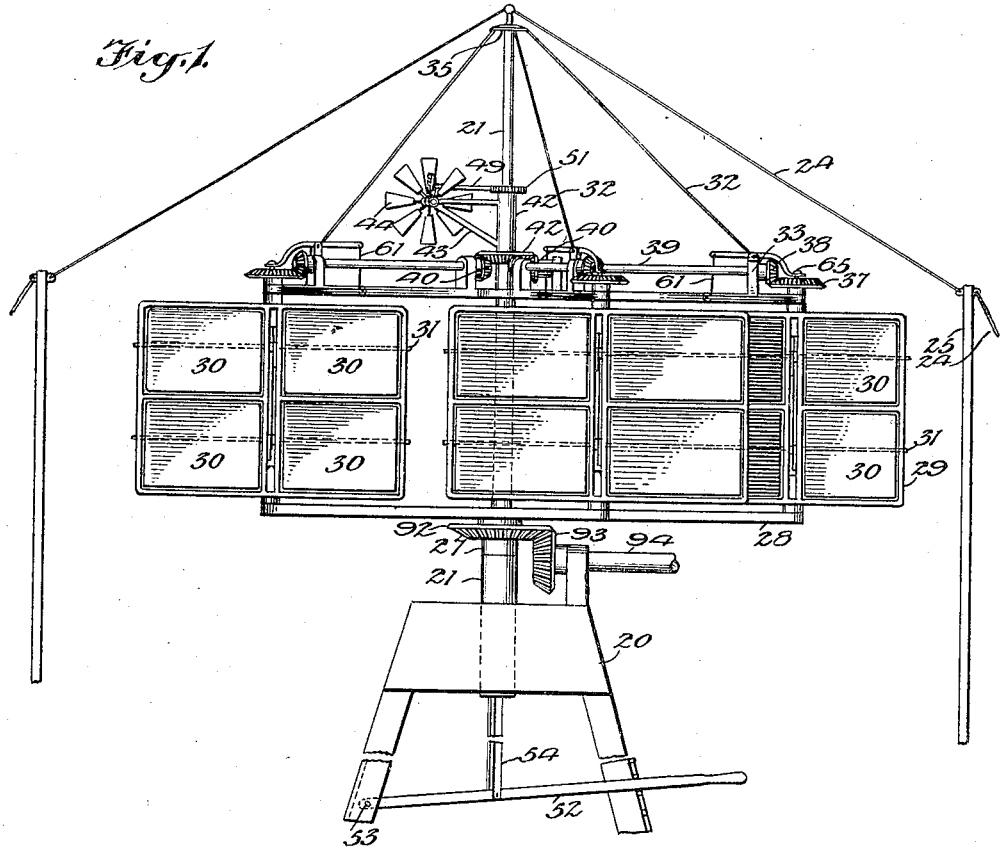
Figure 1 is an elevation of a wind motor embodying my invention.

Wind mill motors of the merry-go-round type as heretofore built employ the ordinary vane to maintain the blades in adjustment to the wind and a limitation to the use of the vane is that it must be large in a motor of reasonable size. This involves expensive construction. Furthermore, in a gusty wind the vane will shift back and forth and not hold the blade steady, thereby creating a considerable back pull by reason of the blades not being at all times in correct relation to the general direction of the wind. By providing for employing a wheel control instead of the vanes I overcome the limitations as to the size of the motor and very materially improve the control of the blades. In addition to the advantage of a reduced cost of construction the wheel control adds very materially to the practicability of the merry-go-round motor. The large vane necessary to a mill of the type takes up too much space to make cable bracing feasible and therefore a track beneath the outer rim of the wheel or a system of expensive rigid bracing must be used. The use of a track adds much to the friction and the rigid braces greatly add to the weight and involve an added cost of construction. These defects and limitations I overcome with my invention.

With my invention both the added weight and added cost for the track construction and rigid braces are eliminated.

In carrying out my invention in accordance with the illustrated example a suitable tower 20 is provided mounting a mast 21, the extreme reduced upper end of which has a suitable fitting 23 for the connection of guy wires or cables 24, the outer ends of which are secured to posts 25, the posts in turn being guyed by wires or cables 26.

A sleeve 27 on the mast 21 has rigid therewith the revoluble frame 28 of the motor. Said frame mounts the separate blade frames 29 provided with sections 30, four sections to a blade being advantageously employed in practice. The blades are mounted in pairs rigid with horizontal shafts 31 turning in the frames 29. The frame 28 is braced by guy wires or cables 32 secured at their outer ends to standards 33 or other convenient members on said frame 28, the inner ends of the guy wires 32 being suitably secured to a cap or ring 35 loosely surrounding the reduced upper end 32 of the mast and resting on ball bearings 35ª.

Figure 4:
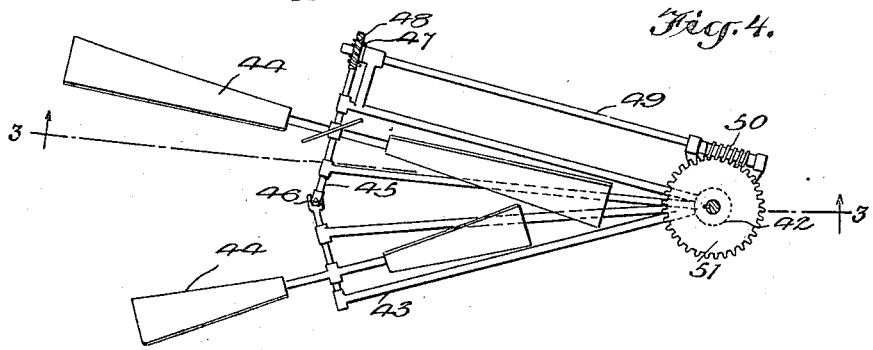
Figure 4 is a plan view of the pair of control-wheels, which wheels turn in planes at an angle to each other as in the preferred form of my invention, particularly for large mills.
Figure 2:
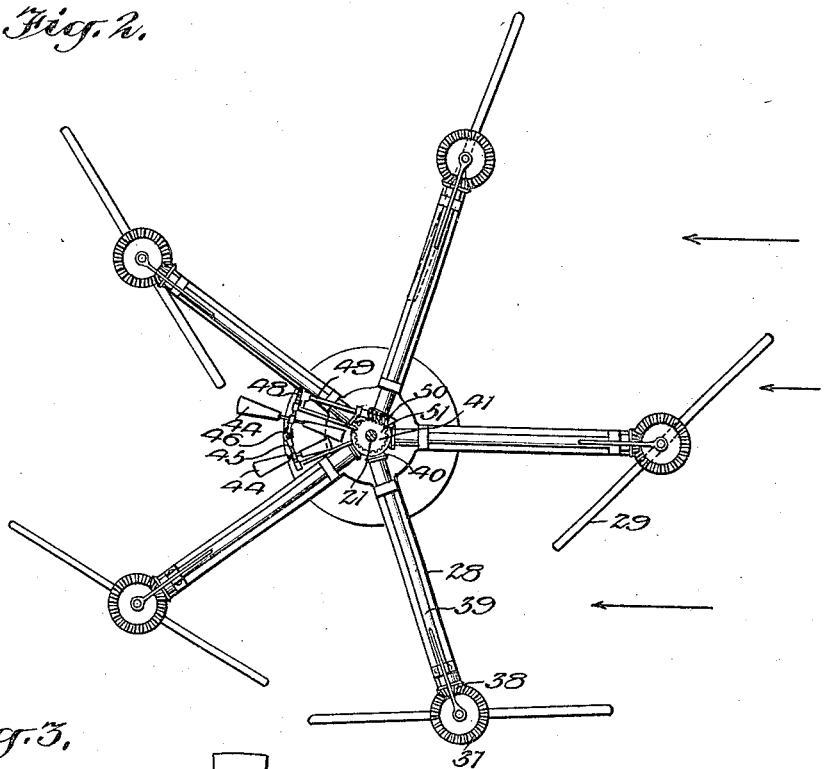
Figure 2 is a plan view of the wind motor, the mast being in section and the guy wires being omitted in the interest of clearness.
Figure 3:
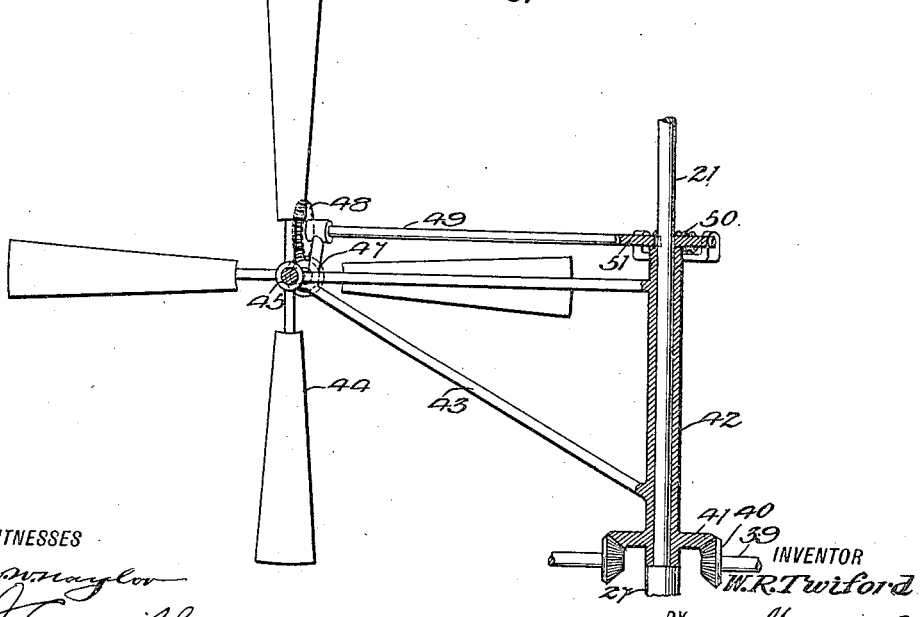
Figure 3 is an enlarged fragmentary vertical section given to show the control wheel and features appurtenant thereto, the plane of the section being indicated by the line 3—3 of Figure 4.

Each blade frame 29 is mounted to turn about a vertical axis so that the blades feather coming into the wind approximately edgewise and presenting a necessary surface when in the wind. For the indicated purpose in the arrangement shown tubular short vertical shafts 36 are provided on the frame 28 at the outer ends of the latter, there being a shaft 36 for each blade frame 29 and rigid with the latter. On the upper end of each shaft 36 is a bevel pinion 37 meshing with which is a bevel pinion 38 on a horizontal shaft 39 running along the frame 28 at the top. As seen in Figure 2 there is employed in the illustrated example five arms for the frame 28 and similarly five blade frames 29 and shafts 39. On the inner ends of the shafts 39 are bevel pinions 40, the several pinions 40 meshing with a single bevel pinion 41 rigid with a sleeve 42 on the mast 21 above the frame 28 on a rigid bracket or brackets 43. On the sleeve 42 is mounted a wheel or wheels 44. In the preferred form as illustrated a pair of wheels 44 is employed, the wheels being in planes at angles to each other as best seen in Figure 4. Also, the blades of one wheel 44 are staggered with respect to the blades on the other wheel 44, so that notwithstanding the blades turn in intersecting planes, there will be no interference between the wheels. The wheels 44 are on a shaft 45 having a universal joint 46 to accommodate the shaft to the angular axes of the wheels 44. On one end of shafts 45 is a worm 47 meshing with a worm wheel 48 on a shaft 49 supported in the bracket structure 43, said shaft 49 at its opposite end having a worm 50 meshing with a worm wheel 51 rigid with the mast 21 above sleeve 42 which is loose on the mast. The several blade frames 29 are emplaced at the desired angle and it will be clear that as the blades and their supporting frame 28 turn about the mast 21 as an axis the engagement of the pinions 40 with the bevel wheel 41, which wheel 41 is held relatively stationary to the pinions 40, the said pinions 40 will travel about the wheel 41 and in doing so said pinions 40 will turn the shafts 39 and the rigid pinions 38 thereon, thereby turning the pinions 37, which being rigid with the shafts 36 and blade frames 29 will turn the shafts 29, thereby feathering said frames 29 with the blades 30 therein to bring the respective blades into the wind in succession.

Upon a shift of the wind the two wheels 44 in planes at angles to each other will insure the turning of either or both wheels in whichever direction the wheels and their brackets 33 are swung with the change of wind. Thus the swinging bodily of the wheels 44 through a lateral arc with the shift of the wind will so present the wheels to the wind that one or both the wheels will receive the revolving pressure of the wind. The revolving of the wheels 44 will turn the shaft 45 and worm 47 and thereby through the worm wheel 48 turn the shaft 49 and cause worm 50 to travel around worm wheel 51, which will turn the sleeve 42 and its pinion 41. The turning of the pinion 41 relatively to the pinions 40 will turn said pinions 40 and the shafts 39, thereby through the pinions 38, 37 turning the shafts 36 and turning the blade frames 29 through an angle to present the blades to the wind, the shift in the angular positions of the frames 29 being proportionate to the swinging of the wheels 44 through an arc by the change in the wind. The drive connections between the wheels 44 and the blade frames 29 including the worm drives 47, 48 and 50, 51 steady the assemblage so that the wheels will not sway as will a vane under gusty winds, said worms serving as locks.

I provide means to positively latch the blade sections 30 to maintain the same in the planes of the respective blade frames 29 and provide manually operable means to release the latches and to swing the sections 30 at any desired angle to the planes of the frames 29 for varying the total effective blade area presented to the wind or for presenting the blade sections edgewise to the wind for throwing the motor out of operation. The latch means and the means to swing the blade sections in the illustrated example are as follows: A lever 52 is fulcrumed at one end at 53 on the tower 20 and between its ends said lever has connection to vertical pull rods 54 extending through the shaft 21 which is tubular and made in two diameters aside from the reduced terminal 22. The pull rods 54 extend through vertical slots 55 in the shaft 21 at the juncture of the portions of different diameters so as to extend at their upper ends alongside the portion of the lesser diameter as clearly shown in Figure 6. The upper ends of the pull rods terminate within the sleeve 27 of the motor frame. The upper end of the rods are provided with a ring 56 extending about the mast 21 and disposed above a collar 57 extending about the rods 54 at their upper ends within the sleeve 27, the arrangement being such that the pulling down of the rod 54 and the ring 56 carried thereby will cause the collar 57 to be moved downwardly within the sleeve 27. Wires or cables 58 connect at their inner ends with the collar 57 there being a wire or cable 58 for controlling the sections 30 of each blade frame 29. One of the wires is shown in Figure 6, the others being omitted in the interest of clearness. Each wire 58 passes over a sheave 59 set in a side opening 60 in the sleeve 27 and runs laterally outward along the frame 28, over sheaves 61 thereon and upwardly to a connection with a lever 62, fulcrumed between its ends as at 63 at the standard 33.

The end of the lever 62 opposite the connection with the cord 61 is flattened and disposed horizontally and formed with a vertical pin hole 64 at the axis of the hollow shaft 36 and bevel pinion 37, the said end of the lever 62 lying beneath the head 65 of the pull pin 66 extending downwardly through the shaft 36 and connecting with latch cords 67 running respectively to the latch means for the blade sections 30. The sections 30 are disposed in pairs rigid with each horizontal shaft 31 so that a latch means for one blade section will control the other blade section of the pair on a shaft 31. The one pull pin 66 controls the latch wires or cords 67 of the two pairs of blade sections 30 in each frame 29. Thus, a short latch wire 67 controls the upper pair of blade sections 30 and a longer latch cord 67 controls the lower pair of blade sections 30, both cords being attached in common to the pull pin 66 of a particular blade. Each cord 67 is attached to an element 68 pivoted as at 69 between its ends on an arm 70 rigid with a shaft 31 mounting the pair of blade sections 30. Said arm 70 is utilized for rocking the shaft 31. The element 62 has a catch 71 engageable by a latch 72 pivoted between its ends as at 73 on the arm 70. A lateral stop stud 74 limits the movement of the latch 72. Also rigid with the shaft 31 at an angle to the arm 70 is a latch arm 75 and extending downwardly to lie in the plane of the blade frame 29 when the sections 30 are in the said plane to receive the full wind pressure. On the lower end of arm 75 is a latch element 76 pivoted between its ends as at 77 to arm 75 and carrying an anti-friction roller 78 on one arm of said element 76. The roller 78 is adapted to be engaged by a plate spring 79 secured to the adjacent horizontal member of the blade frame 29, said spring being adjustable as to its tension by a set screw 80. That arm of the latch element 76 opposite to the arm carrying the roller 78 has a transverse pin hole 81. Said latch element 76 is adapted to swing to a position parallel with latch arm 75 or to position at right angles thereto, one position being indicated in Figures 9 and 10 and the other position in Figures 7 and 12. With the element 76 alongside the arm 75 the pin hole 81 will register with a pin hole 82 in said arm 75. A pin 83 on a plate spring 84 secured to arm 75 is adapted to extend through the hole 82 into a hole 81 for holding the element 76 alongside arm 75 or when spring 84 is flexed laterally and the arm 75 is moved through an arc to dispose the blade sections 30 to the angle of the blade section 29 as in the position in Figures 7 and 12 the element 76 will under the weight of the arm 78 maintain its vertical position while arm 75 moves through said arc, thereby disposing the element 76 at an angle normal to arm 75 as clearly shown in Figure 12. The purpose of thus arranging the element 76 is to cause the roller 78 to engage the spring 79 as the arm 75 and the blade sections 30 are restored to the plane of the frame 29. As the roller 78 is engaged by the spring 79 the continued movement of the arm 75 toward the plane of the frame 29 results in a toggle action between said arm 75 and the latch element 76 so that the spring is placed under tension as said arm 75 and said element 76 reach the position parallel with each other in the plane of frame 29. To withdraw the pin 83 the spring 84 has a pin 85 integral therewith which may have movement in a slot 86 in one arm of a lever 87 generally of the bellcrank order with the arms of the lever at an acute angle. The lever 87 is fulcrumed at the angle thereof as at 88 on the latch arm 75 and the second arm 89 of said lever has secured thereto a latch cord or wire 90 that extends upwardly and is attached to the element 68 to which the wire or cord 67 is secured.

When the blade sections 30 and latch arm 75 are in the plane of the frame 29 for said sections to receive the full wind pressure, the element 68 will be in a lowered position as in dotted lines, Figure 10 and therefore an obtuse angle to the operating arm 70 of shaft 31. In this position of the element 68 there will be slack in the latch cord 90 which has sufficient length for the purpose. When now an upward pull is exerted by the pull pin 66 on the cord 67, the element 68 will be rocked on its pivot 69, thereby releasing said element from the latch 72 and there will be a movement of the element 68 relatively to the operating arm 70, said element 68 merely turning on its pivot 69 when exerting a pull upwardly on an operating arm 70, after which the pull on the cord 67 will carry the arm 70 upwardly thereby rocking the shaft 31 and disposing the blade sections 30 at a greater or less angle to the plane of the frame 29 to lessen the total effective surface of the blade sections presented to the wind, or if the pull on the cord 67 be continued the blade sections 30 will be brought to positions normal to the plane of the frame 29 as in Figure 7, whereby said blade sections are presented edgewise to the wind for throwing the motor out of operation. The initial movement of the element 68 in response to a pull on cord 67 or that movement of said element 68 which is merely pivotal about the center 69 will have taken up the slack in the cord 90 so that before the arm 70 is rocked upwardly to shift the angle of the blade sections 30 the cord 90 will have exerted a pull on lever 87, thereby through the engagement with pin 85 flexing the spring 84 and withdrawing the pin 83 from the pin hole 81, thus releasing the latch element 76 from the arm 75 to permit a relative turning movement of said element 76 about its pivot 77. The upward movement of element 68 and with the carrying upward of the arm 70 will now leave the blade sections 30 and latch arm 75 free to move through an angle from the plane of the frame 29, the roller 78 readily releasing itself from the spring 79 owing to the toggle action that obviously takes place between the arm 75 and element 76. When the blade sections 30 and arm 75 are moved to the plane of the frame 29 the roller 78 will strike the end of the spring 79 and be firmly engaged thereby as previously referred to. In the returning position of the arm 75 to the plane of the frame 29 and the restoration of the latch element 76 to a position alongside said arm 75 I cause the pin 83 to be automatically engaged for permitting it to spring into the hole 81, the means for the purpose being a curved cam member 91 on latch element 76 at the end having the pin hole 81, said cam member 91 being adjacent to the pin hole 81. The described latch and operating means for the blade sections 31 result in a positive control of said blade sections to suit wind conditions in accordance with the will of the operator.

As one means for taking off power from the motor wheel I have illustrated a bevel pinion 92 which is rigid with the sleeve 27 and meshes with a pinion 93 on a driven shaft 94.

I would state in conclusion that while the illustrated example constitutes a practical embodiment of my invention, I do not limit myself strictly to the exact details herein illustrated, since, manifestly, the same can be considerably varied without departure from the spirit of the invention as defined in the appended claims.

Having thus described my invention, I claim:

1. A wind motor including a motor wheel having a plurality of blades mounted to revolve about the axis of the wheel and to turn about their individual axes, a controlling wind wheel for disposing the respective blades in positions to be presented in succession to the wind, said control wheel being mounted to revolve about its own horizontal axis and to be turned bodily through an arc about a vertical axis in a plane containing the axis of said motor wheel, and connections between said controlling wheel and the several blades to vary the angular positions of the blades by the motion of said controlling wheel about its own axis upon a shift of the angular position of said controlling wheel by a shift of the wind.

2. In a wind mill of the merry-go-round type, a motor wheel, a pair of controlling wind wheels disposed in intersecting planes, and means to cause the blades of said motor wheel to be presented to the wind in succession by the movements of said controlling wheels.

3. In a wind motor of the class described, a motor wheel, a controlling wind wheel therefor, and means acted upon by said controlling wheel and acting upon said motor wheel to conform the said motor wheel to shifts of the wind.

4. In a wind motor of the class described, a motor wheel having a plurality of blades mounted to revolve about the axis of the wheel and adapted to be turned about their individual axes, a controlling wind wheel for causing the respective blades to be presented in succession to the wind, and connections between the shaft of the wind wheel and the shafts of the blades for causing the blades to respond to the revolving of said controlling wheel by the wind when shifted.

5. A wind motor of the merry-go-around type including a motor wheel, a pair of controlling wheels turning in intersecting planes, a shaft turning with either or both of said controlling wheels, and means to shift the angular positions of the blades of the motor wheel by the turning of said shaft.

6. A wind motor of the class described including a motor wheel, a controlling wind wheel for the blades of said motor wheel, shafts on which the blades of the motor wheel are mounted, a worm on the shaft of said controlling wheel, a second shaft having a worm wheel in mesh with said worm, a worm on the second-mentioned shaft, and means driven by said second worm and serving to turn the shafts of the blades for varying the angular positions of said blades.

7. In a wind mill of the class described, a mast, a sleeve on said mast, a motor wheel comprising a frame rigid with said sleeve and having blades mounted in said frame, to turn about vertical axes, a second sleeve on the mast above the first sleeve, a drive element on said second sleeve, means to turn the blades of the motor wheel from said drive element, a controlling wind wheel, a shaft driven by the turning of said controlling wheel, and a drive connection between said shaft and said second sleeve.

8. A wind motor of the class described including a motor wheel having blades turnable to various angular positions to successively present the blades to the wind, actuating means on said motor wheel for turning the blades, a sleeve coaxial with said motor wheel, a controlling wind wheel to determine the angular positions of the blades, means on said sleeve supporting the shaft of said controlling wheel, said controlling wheel and sleeve being turnable about a vertical axis to respond to a shift of the wind, drive connections between the shaft of the controlling wheel and the said sleeve, and drive connections between said sleeve and said blade actuating means on the motor wheel.

9. In a wind motor of the class described, a motor wheel having a blade turnable about vertical axes to vary the angular positions of the blades, actuating means on said motor wheel for turning said blades, a pair of controlling wind wheels turning in intersecting planes, a jointed shaft on which said wheels are fast, means supporting said controlling wheels and said jointed shaft, and turnable about a vertical axis to permit the bodily swinging of the controlling wheels through an arc of a circle in response to a shift of wind, and means responsive to the revolving of said jointed shaft and adapted to actuate said blade-actuating means.

10. In a wind mill of the class described, a motor wheel turning about a vertical axis and having feathering blades to present the blades successively to the wind, a pair of controlling wind wheels for the motor wheel, a shaft adapted to be turned with a turning of said controlling wheels, operative connections between said shaft and said blades to vary the angular position of the blades with the turning of said shaft, said controlling wheels mounted to revolve in intersecting planes and the blades of the respective wheels being in staggered relation.

11. In a wind mill of the class described, a motor wheel having a plurality of blades, each blade comprising a frame and a plurality of blade sections mounted in said frame to turn to various angular positions, latch means for the blade sections, and manually operable means to release said latches and move the blades for varying their angular positions.

12. In a wind motor of the class described, a motor wheel having blades each provided with a plurality of blade sections, springs on the frame to hold the blade sections in the plane of the frame, turnable elements on the blade sections adapted to engage said springs, a pin to hold said turnable elements in the plane of the blade sections when the latter are in the plane of the frame, arms on the shafts of the blade sections to turn said sections, a manually operable pull element, and means responsive to said pull element, serving to disengage said pin and then to throw said arm for varying the angular positions of the blade sections.

13. A wind motor of the class described, including a motor frame, blade frames in said wheel, vertical shafts on which said blade frames are fixed, pinions on said shafts, a plurality of blade sections in said frames, shafts carrying said blade sections and mounted in said frame, means to secure the blade sections in the plane of the blade, controlling means for said blade securing means, and pull pins coaxial with said shafts for operating said controlling means, a wind wheel for controlling the angular positions of the blade frames, means to turn the said pinions with the revolving of said controlling wheel, and manually operable means for actuating said pull pins.

14. In a wind mill of the merry-goround type, a mast, a motor wheel turning about the mast as an axis, a wind wheel controlling the blades of said motor wheel to hold the motor wheel to the wind, guy members secured to said motor wheel, an element revoluble on the mast and to which said guy members are secured, said guy members being disposed outside of said controlling wind wheel, and guy members secured to the mast above the first mentioned guy members and extending outwardly of the motor wheel.

WILLIAM RICHARD TWIFORD.